(12) United States Patent
Kishikawa et al.

(10) Patent No.: US 9,549,169 B2
(45) Date of Patent: Jan. 17, 2017

(54) STEREOSCOPIC MAP DISPLAY SYSTEM

(71) Applicant: Geo Technical Laboratory Co., Ltd., Fukuoka-shi, Fukuoka (JP)

(72) Inventors: Kiyonari Kishikawa, Fukuoka (JP); Tsubasa Tomitaka, Fukuoka (JP); Masaya Ada, Fukuoka (JP); Tatsuji Kimura, Fukuoka (JP)

(73) Assignee: Geo Technical Laboratory Co., Ltd., Fukuoka-shi (JP)

( * ) Notice: Subject to any disclaimer, the term of this patent is extended or adjusted under 35 U.S.C. 154(b) by 0 days.

(21) Appl. No.: 14/665,338

(22) Filed: Mar. 23, 2015

(65) Prior Publication Data

US 2015/0195512 A1    Jul. 9, 2015

Related U.S. Application Data

(63) Continuation of application No. PCT/JP2013/074185, filed on Sep. 9, 2013.

(30) Foreign Application Priority Data

Oct. 4, 2012    (JP) .................................. 2012-221759

(51) Int. Cl.
*G06T 15/00* (2011.01)
*H04N 13/04* (2006.01)
(Continued)

(52) U.S. Cl.
CPC ........... *H04N 13/0409* (2013.01); *G06T 17/05* (2013.01); *G09B 29/106* (2013.01);
(Continued)

(58) Field of Classification Search
CPC .......... G06T 19/00; G06T 17/20; G06T 17/00; G06T 15/10; G06T 15/00
See application file for complete search history.

(56) References Cited

U.S. PATENT DOCUMENTS

| | | | | |
|---|---|---|---|---|
| 5,826,212 A | * | 10/1998 | Nagai | G01C 21/3638 340/990 |
| 6,324,469 B1 | * | 11/2001 | Okude | G01C 21/3638 340/990 |
| 8,131,064 B2 | * | 3/2012 | Mashitani | H04N 13/0296 382/154 |
| 9,042,636 B2 | * | 5/2015 | Turner | H04N 13/026 382/103 |
| 2003/0071765 A1 | * | 4/2003 | Suyama | G02B 27/2278 345/6 |
| 2004/0240056 A1 | * | 12/2004 | Tomisawa | G02B 27/2278 359/462 |
| 2005/0089212 A1 | * | 4/2005 | Mashitani | H04N 13/0296 382/154 |
| 2005/0140676 A1 | | 6/2005 | Cho | |
| 2007/0063997 A1 | * | 3/2007 | Scherer | A63H 9/00 345/419 |
| 2007/0229540 A1 | | 10/2007 | Nakahara et al. | |
| 2011/0292189 A1 | | 12/2011 | Newton et al. | |
| 2012/0083312 A1 | * | 4/2012 | Kim | G02B 13/001 455/556.1 |
| 2012/0176481 A1 | * | 7/2012 | Lukk | H04N 13/0011 348/47 |

(Continued)

FOREIGN PATENT DOCUMENTS

| | | |
|---|---|---|
| JP | 2004-125871 | 4/2004 |
| JP | 2007-264176 | 10/2007 |
| JP | 2011-186960 | 9/2011 |

OTHER PUBLICATIONS

International Search Report dated Oct. 15, 2013 from International Application No. PCT/JP2013/074185.

(Continued)

*Primary Examiner* — Abderrahim Merouan
(74) *Attorney, Agent, or Firm* — Beyer Law Group LLP

(57) ABSTRACT

A stereoscopic map display system includes (a) a stereoscopic vision display unit for providing a stereoscopic vision by displaying a right-eye image and a left-eye image with parallax so as to be visually recognizable by the right eye and the left eye, respectively, (b) a map database storage unit for storing map data, and (c) a display control unit for providing the right-eye image and the left-eye image at least part of which has the parallax, to the stereoscopic vision display unit based on the map data. The map data stores feature data indicating a shape of a feature and a display- (Continued)

depth adjusted object indicating an object other than the feature and displayed by a display depth under a predetermined rule. The display control unit displays the display-depth adjusted object with the multi-staged display depths under a predetermined rule for an attribute or a display position thereof.

16 Claims, 8 Drawing Sheets

(51) Int. Cl.
| | |
|---|---|
| G06T 17/05 | (2011.01) |
| G09B 29/10 | (2006.01) |
| G09B 29/12 | (2006.01) |
| H04N 13/00 | (2006.01) |
| H04N 13/02 | (2006.01) |
| G06T 11/00 | (2006.01) |
| G06T 19/00 | (2011.01) |
| G06T 11/60 | (2006.01) |
| G06F 9/44 | (2006.01) |
| G06F 3/0481 | (2013.01) |

(52) U.S. Cl.
CPC ......... *G09B 29/12* (2013.01); *H04N 13/0022* (2013.01); *H04N 13/0066* (2013.01); *H04N 13/0275* (2013.01); *G06F 3/0481* (2013.01); *G06F 9/4443* (2013.01); *G06T 11/00* (2013.01); *G06T 11/60* (2013.01); *G06T 19/00* (2013.01)

(56) References Cited

U.S. PATENT DOCUMENTS

2013/0076746 A1* 3/2013 Chung ............... H04N 13/0022
 345/424

OTHER PUBLICATIONS

European Search Report dated May 24, 2016 from European Application No. 13844102.7.

* cited by examiner

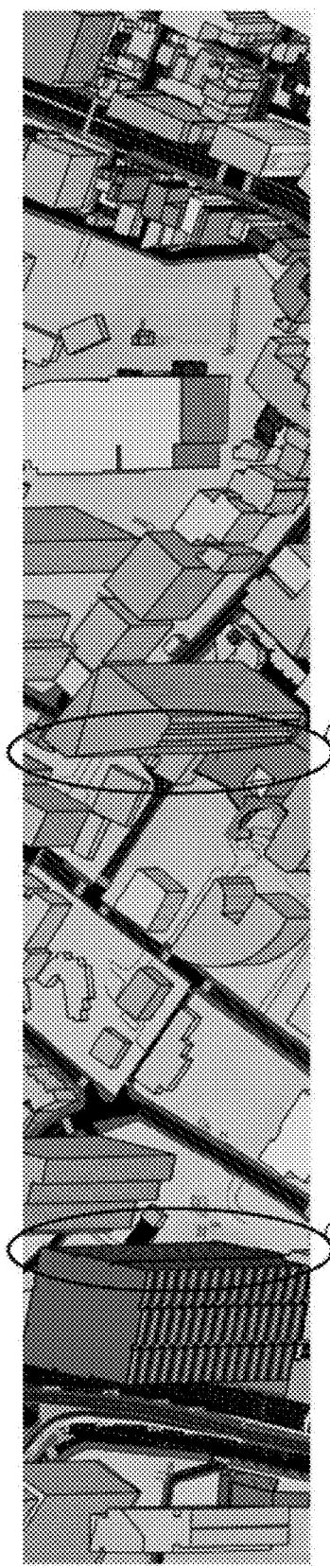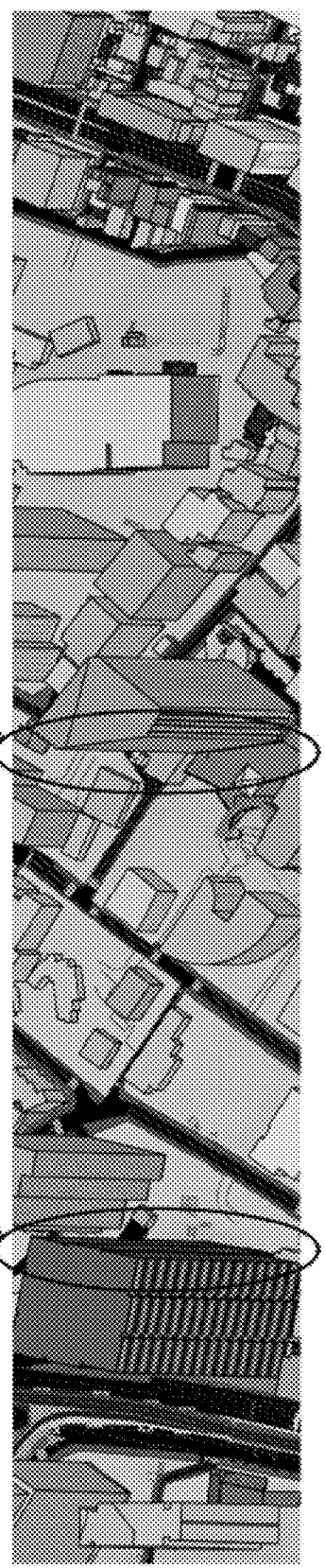

STEREOSCOPIC MAP DISPLAY SYSTEM

CLAIM OF PRIORITY

The present application is a Continuation of International Application No. PCT/JP2013/074185 filed on Sep. 9, 2013, which claims benefit of Japanese Patent Application No. 2012-221759 filed Oct. 4, 2012. The entire contents of each application noted above are hereby incorporated by reference.

BACKGROUND OF THE INVENTION

1. Field of the Invention

The present invention relates to a stereoscopic map display system for performing stereoscopic vision by displaying an image for the right eye and an image for the left eye by giving parallax.

2. Description of the Related Art

In an electronic map used in a navigation apparatus, a computer screen and the like, a three-dimensional map expressing features such as a building in three-dimensionally is used in some cases. As an example for such a three-dimensional map, Japanese Unexamined Patent Application Publication No. 2011-186960 discloses a method of displaying a three-dimensional map using map data prepared in advance in the form of image data drawn three-dimensionally by parallel projection. Regarding the three-dimensional map, a method of displaying a three-dimensional model expressing a three-dimensional shape of a feature by perspective projection and the like are known in addition to the above-described method.

BRIEF DESCRIPTION OF THE INVENTION

Display targets for a three-dimensional map are not limited to features but also include various types of information such as characters expressing a name of a feature, a name of a place and guidance information, map symbols and traffic restriction signs, a current position and a route in route guidance, and the like. However, since these types of information should be displayed in association with the feature or geographical feature due the nature of a map, their contents cannot be easily read in some cases due to overlapping between the information and the features, overlapping between the information themselves and the like. Though it is possible to employ a method of avoiding overlapping by adjusting a display position or a display size of the information, such an avoiding measure has a limitation within a range with abundant information.

Such problem is not limited to the three-dimensional maps but can similarly occur in two-dimensional maps. However, in a three-dimensional map, a drawn area of each feature tends to become larger since a side surface of the feature is drawn, so the above-described overlapping may occur easily.

The present invention has been made in view of these problems and has an object to provide various types of information displayed on a map other than the features in an aspect that can be read easily.

The present invention is a stereoscopic map display system for stereoscopic vision of a map by giving a display depth, which can be configured to include: (a) a stereoscopic vision display unit for realizing stereoscopic vision by displaying an image for the right eye and an image for the left right eye given parallax that can be visually recognized by the right eye and the left eye, respectively; (b) a map database storage unit for storing map data; and (c) a display control unit for providing the image for the right eye and the image for the left eye, to at least a part of which parallax is given, to the stereoscopic vision display unit on the basis of the map data. In the map data, feature data indicating a shape of a feature and a display depth adjusted object indicating an object other than the feature and displayed with a display depth under a predetermined rule are stored, and the display control unit displays the display depth adjusted object with the display depth in multiple stages under a predetermined rule relating to its attribute or display position.

Here, the display depth adjusted object includes various types of information other than the features displayed on the map. For example, it includes characters expressing a name of a feature, a name of a place, guidance information and the like, map symbols and traffic restriction signs, a current position and a route in the route guidance, and the like. In a meaning as an object not having a three-dimensional shape such as a feature, it can be also referred to as a two-dimensional object.

The map data may be data for displaying two-dimensional maps or data for displaying three-dimensional maps.

According to the stereoscopic map display system of the present invention, these display depth adjusted objects can be stereoscopically displayed with display depth in multiple stages. As a result, even if a part of the display depth adjusted object is hidden by another display depth adjusted object, the both display depth adjusted objects can be easily discriminated by a difference in the display depth. As a result, contents of the hidden display depth adjusted object can be easily estimated even if the entire image cannot be seen.

The display depth in multiple stages means that the display depth of the display depth adjusted object is made different, and the display depth can be set on the basis of an attribute or a display position of the display depth adjusted object. The display depth in multiple stages means two types or more of the display depth, and its value may be an arbitrary value or can be chosen from values set in advance by quantization.

Setting on the basis of the attribute includes-methods for displaying with a display depth set in advance in accordance with the type of the display depth adjusted object, for example, such as a method of setting the display depth in the order of information relating to character>symbols>route guidance so that the attribute can be seen from the front to the depth. The display depth may be set by further segmenting the type of the information relating to the character, symbols and the like, and route guidance and the like. Moreover, the display depth does not necessarily have to be set with characters on the front but can be arbitrary. The attribute may include attributes of the feature associated with the display depth adjusted object and the like. For example, if the display depth adjusted object is a name of a feature, a method of setting the display depth in accordance with a height of the feature with which the name is associated may be employed.

As the setting on the basis of the display position, if the display depth adjusted objects are overlapped with each other, for example, a method of displaying one on the front and the other on the depth is applicable. Which one is to be on the front can be set arbitrarily. It may be determined on the basis of the attribute or may be determined in accordance with a size of a display range of the display depth adjusted object, for example.

In the stereoscopic map display system of the present invention, the display control unit may provide the image for the right eye and the image for the left eye expressing the feature data three-dimensionally in a state given parallax.

As a result, a three-dimensional map image to be a background of the display depth adjusted object can be also stereoscopically viewed, and a height of a feature and the like can be recognized instinctively while a sense of discomfort in stereoscopic vision of the display depth adjusted object can be reduced.

If a three-dimensional map is also to be stereoscopically viewed, a method of setting the display depth of a display depth adjusted object in accordance with a height of a feature and the like may be employed, for example. This corresponds to an aspect of setting of the display depth on the basis of the attribute described above. In this way, there is an advantage that a correspondence relationship between the display depth adjusted object and the feature and the like can be instinctively recognized.

In the above-described aspect, an image for the right eye and an image for the left eye can be provided in various ways.

First, as map data, a three-dimensional model storing a three-dimensional shape of a feature is prepared, and a display control unit may generate an image for the right eye and an image for the left eye by projecting this three-dimensional model. In this method, perspective projection according to specified viewpoint position and visual line direction can be applied, and stereoscopic vision with less sense of discomfort can be realized.

Secondly, a method of storing an image for the right eye and an image for the left eye in advance may be employed.

In this case, the map data is parallel projection data for the right eye and parallel projection data for the left eye as two-dimensional images obtained by parallelly projecting data expressing a three-dimensional shape of a feature from a diagonal direction inclined with respect to a vertical direction only by a predetermined projection angle by changing a projection condition so that the parallax is given, and the display control unit may be configured to provide a range corresponding to a range to be displayed from the parallel projection data for the right eye and the parallel projection data for the left eye to the stereoscopic vision display unit.

Unlike perspective projection, parallel projection does not have to determine a viewpoint, and thus, a projected result of drawing can be used in common however the drawing range of a map is specified. Therefore, in the above-described aspect, the image for the right eye and the image for the left eye for stereoscopic vision can be prepared in advance as two-dimensional image data, which eliminates necessity of projection processing at display, and a processing load can be reduced.

Unlike the perspective projection, a viewpoint position is not specified in the parallel projection as described above. Thus, parallax cannot be given easily so that the parallel projection has been considered to be no suitable for stereoscopic vision. However, the inventor of the present application found that, by making a projection direction different between parallel projection for the right eye and for the left eye, that is, by giving a rotation angle around an axis orthogonal to the both as parallax in addition to a projection azimuth and a projection angle during parallel projection, practical stereoscopic vision can be realized. The above-described aspect was realized by such finding.

In the aspect in which the parallel projection data for the right eye/left eye is prepared in advance, a plurality of types of feature data with different projection azimuths may be stored for the same region. In this way, a three-dimensional map in a stereoscopic vision can be provided in accordance with an azimuth specified by a user, whereby convenience can be improved. Particularly, if a three-dimensional map is used for route guidance, by using three-dimensional maps with different projection azimuths in accordance with a route to be guided, heading-up display displaying a traveling direction on an upper side can be smoothly realized.

Moreover, in the above-described aspect, the display depth adjusted object may be prepared in advance as images for the right eye/left eye in a state drawn with parallax according to the display depth. In this way, stereoscopic vision of the display depth adjusted object can be also realized with a light load.

In the stereoscopic map display system of the present invention, the display control unit may be configured to provide: (a) an image for the right eye and an image for the left eye given parallax for the feature data by making projection conditions for three-dimensional expression different between those for the right eye and those for the left eye; and (b) an image for the right eye and an image for the left eye for the display depth adjusted object by giving parallax by moving its display position parallel in accordance with the display depth.

That is, this is an aspect in which stereoscopic vision is realized by methods different between the three-dimensional map to be a background and the display depth adjusted object.

FIGS. 1A through 1C are explanatory diagrams illustrating a principle of stereoscopic vision of a display depth adjusted object. As illustrated in FIG. 1A, a character A indicates an offset, that is, parallelly moved with respect to a display to a position Ar for the right eye and a position Al for the left eye, respectively, and displayed. If such image is looked at by the both eyes, as illustrated in the figure, the character A is recognized such that an image is formed at a position in front of the display. Similarly, by displaying a character B at a position Br for the right eye and a position Bl for the left eye, if the character B is looked at by the both eyes, an image of the character B is recognized as it is formed at a position in front of the display. Since offset of the character B is larger than offset of the character A, a formed image height of the character B is larger, and the character B looks on the front.

FIG. 1B illustrates states of images for the right eye/left eye at that time. A center reference image illustrates a state in which the characters A and B are displayed at their original display positions Ac and Bc, respectively. By offsetting the characters A and B as illustrated in FIG. 1A, respectively, an image for the left eye and an image for the right eye can be generated. In FIG. 1B, display positions are indicated by points, but actually, a character string having this point as a representative point is displayed.

FIG. 1C illustrates a state in which the images for the right eye/left eye generated as above are seen by the both eyes from the front. As illustrated on the left side, the character B can be visually recognized in front of the character A at a position of a center reference image. On the right side, an effect of the offset is schematically illustrated. A display depth between the character B and the character A is changed by a difference in offset amounts between the character B and the character A. That is, if the difference in the offset amounts is small, the character B and the character A look close in a depth direction as illustrated on the left side, while if the difference in the offset amounts is large, they look away from each other in the depth direction as illustrated on the right side.

In FIGS. 1A though 1C, a character is used as an example, but the display depth of other display depth adjusted objects can be also adjusted by the offset amount.

As described above, if parallax is given by a method of parallel movement of the display depth adjusted object, stereoscopic vision can be realized with a light load regarding the display depth adjusted object. Therefore, convenience can be also improved such that the display depth is flexibly changed at display.

Regarding the display depth adjusted object, parallax to be parallelly moved for the images for the right eye/left eye may be a value fixed in advance or may be calculated each time at display. In the latter case, a function or a map for giving parallel movement amounts for the right eye/left eye to the display depth may be prepared in advance so that an aspect of setting the parallel movement amount on the basis of the function or map can be employed.

In the stereoscopic map display system of the present invention, a display depth setting unit for setting the display depth on the basis of an instruction by a user in relation to the display depth adjusted object may be provided, and the display control unit may be configured to generate parallax in the display depth adjusted object in accordance with a setting result by the display depth setting unit.

In this way, a display aspect can be flexibly changed in accordance with the instruction. If the display depth adjusted objects are overlapped with each other, for example, the display aspect may be switched so that the hidden side is displayed on the front. Moreover, by specifying the display depth in accordance with the type of the display depth adjusted object, information required by the user can be provided in a state that can be recognized more easily such that route guidance is displayed on the foremost side, for example.

The present invention does not necessarily have to include all of the above-described various features but can be configured by omitting or combining a part of them as appropriate.

Moreover, the present invention can be configured in various ways in addition to the aspect as the stereoscopic map display system. For example, in the present invention, an aspect in which the images for the right eye/left eye are prepared in advance in a state in which both the map data to be a background and the display depth adjusted object are included by parallel projection can be employed, but in such aspect, the present invention may be configured as a stereoscopic map display data generation system for generating image data for the right eye/left eye used for displaying a stereoscopic map.

That is, the stereoscopic map display data generation system is provided with a map database storing a three-dimensional model expressing a three-dimensional shape of a feature and the display depth adjusted object, and a parallel projection unit for generating parallel projection data for the right eye and parallel projection data for the left eye including the feature and display depth adjusted object, respectively, by performing parallel projection in visual line directions specified for the right eye/left eye, respectively, for the three-dimensional model and by giving parallax to the display depth adjusted object.

Regarding the display depth adjusted object, the image data for the right eye/left eye may be generated by virtually setting a plate-shaped polygon expressing the adjusted object in a three-dimensional space similar to a three-dimensional model and by executing projection processing together with the three-dimensional model. Besides the three-dimensional model, the image data may be generated by parallel movement of the display depth adjusted object. The present invention may be configured as a method of displaying a stereoscopic map for displaying a stereoscopic map by a computer or may be configured as a computer program to be executed by a computer. Moreover, the present invention may be configured as a computer-readable recording medium storing such computer program. As the recording medium, various types of computer-readable mediums such as a flexible disk, a CD-ROM, a magneto-optical disk, an IC card, a ROM cartridge, a punch card, a printed matter on which codes such as a barcode are printed, an internal storage apparatus (memory such as a RAM and a ROM) and an external storage apparatus of a computer and the like can be used.

BRIEF DESCRIPTION OF DRAWINGS

FIGS. 5A and 5B are explanatory diagrams illustrating an example of parallel projection data for right eye/left eye.

DESCRIPTION OF EMBODIMENTS OF THE INVENTION

EXAMPLE 1

Figure 2:
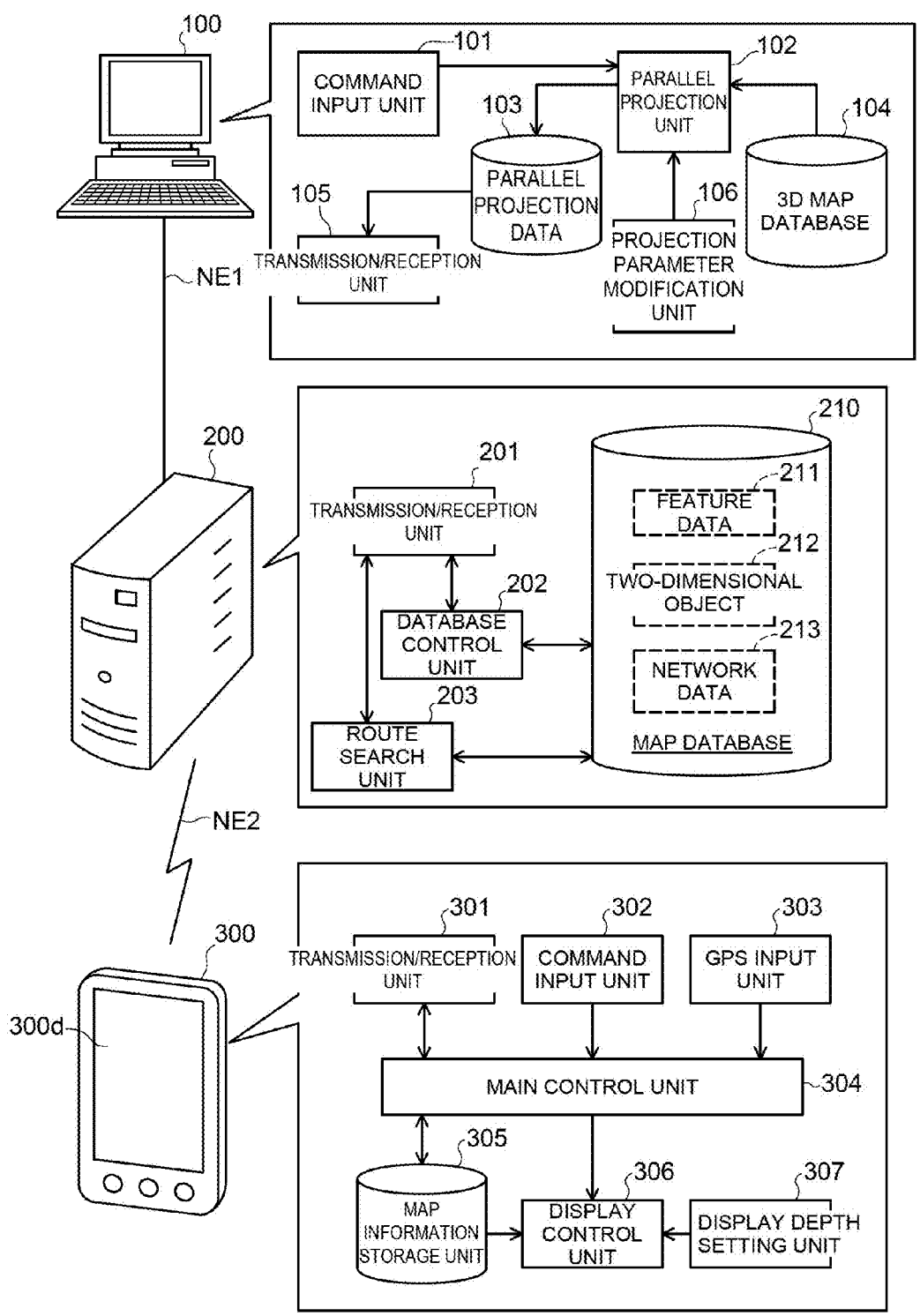
FIG. 2 is an explanatory diagram illustrating a configuration of a stereoscopic map display system.

A. System Configuration:

FIG. 2 is an explanatory diagram illustrating a configuration of a stereoscopic map display system. Here, a system for displaying a map in three-dimensionally and capable of stereoscopic vision by parallel projection and also for displaying characters and the like drawn on that, capable of stereoscopic vision, will be exemplified. In a meaning not of a map drawn simply three-dimensionally but of a map capable of stereoscopic vision, a map displayed in the example will be referred to as a stereoscopic map in the following.

While the map is displayed three-dimensionally, characters and the like to be adjusted for display depth (corresponding to a display depth adjusted object in the present invention) are two-dimensional data, and thus, the display depth adjusted object handled in the example below might be referred to as a two-dimensional object.

FIG. 2 illustrates a configuration example for displaying a map on a display 300d of a terminal 300 on the basis of map data provided from a server 200 via a network NE2 or the like. A smartphone is used as the terminal 300, but a cell phone, a personal computer, a navigation apparatus and the like may be also used. Moreover, the three-dimensional stereoscopic map display system may be also con4ured as a system operating standalone other than the system composed of the terminal 300 and the server 200.

In the figure, a data generating apparatus 100 for generating map data is also illustrated.

The display 300*d* of the terminal 300 has a stereoscopic vision function which can display the image for the right eye and the image for the left eye so that they can be visually recognized by the right eye and the left eye, respectively. In this example, the display 300*d* capable of stereoscopic vision by so-called naked eyes is used, but a device for stereoscopic vision by using glasses for stereoscopic vision and the like may be also used.

In the terminal 300, various functional blocks operating under a main control unit 304 are constituted. In this example, the main control unit 304 and each of the functional blocks are configured by installing software which realizes the respective functions, but a part of or the whole of them may be configured by hardware. A transmission/reception unit 301 conducts communication with the server 200 via the network NE2. In this example, transmission/reception of map data and a command for displaying a stereoscopic map is mainly conducted. A command input unit 302 inputs an instruction from a user through an operation of a button or a touch panel and the like. An instruction in this example includes specification of a display range and expansion/contraction of a three-dimensional map, setting of a place for departure and a destination when route guidance is to be given, and the like. A GPS input unit 303 obtains a coordinate value of a latitude and a longitude on the basis of a GPS (Global Positioning System) signal. Moreover, in the route guidance, a traveling direction is calculated on the basis of a change in the latitude/longitude.

A map information storage unit 305 is a buffer for temporarily storing map data provided from the server 200. If a map to be displayed is continuously moving as in the case of route guidance, map data of a range which is not sufficient with the map information storage unit 305 is received from the server 200 so as to display a map. A display depth setting unit 307 sets a display depth of a two-dimensional object displayed on the map. A setting method of the display depth will be described later. A display control unit 306 displays a stereoscopic map on the display 300*d* of the terminal 300 on the basis of the map data stored in the map information storage unit 305 and a setting result of the display depth setting unit 307.

In the server 200, illustrated functional blocks are configured. In this example, these functional blocks are configured by installing software which realizes the respective functions but a part of or the whole of them may be configured by hardware.

A map database 210 is a database for displaying a stereoscopic map. In this example, map data including feature data 211, a two-dimensional object 212, and network data 213 is stored. The network data 213 can be omitted. The feature data 211 is data for displaying features such as roads, buildings and the like three-dimensionally and capable of stereoscopic vision and is two-dimensional polygon data obtained by parallelly projecting a three-dimensional model of a feature for the right eye/left eye, respectively, by changing a projection condition. That is, as the map data 211, the image for the right eye as two-dimensional image data obtained by parallel projection under the condition for the right eye and the image for the left eye as two-dimensional image data obtained by parallel projection under the condition for the left eye for one map region are stored.

The two-dimensional object 212 is characters expressing a name of a feature, a name of a place, guidance information and the like which should be displayed on the map other than the features, map symbols/traffic restriction signs, symbol data indicating a current position, polygon data of arrows constituting a route and the like in the route guidance, and the like. Except those with unstable display positions such as the current position or route, the two-dimensional object 212 stores data such as characters and symbols which should be displayed and display positions associated with each other. The display position may be a position on a three-dimensional space or may be a position coordinate on a projection image parallelly projected. Moreover, regarding the two-dimensional object 212 associated with a specific feature such as the feature name, data indicating association with the feature is also stored.

In this example, the two-dimensional object 212 is to give parallax at display, but as a variation, it may be configured capable of stereoscopic vision with parallax determined in advance. In such a case, the two-dimensional object 212 may be stored in a format of the image for the right eye and the image for the left eye capable of stereoscopic vision. Alternatively, image data in a state in which the feature data 211 and the two-dimensional object 212 are superposed can be stored as the feature data 211.

The network data 213 is data expressing roads by a collection of a node and a link. The node is data corresponding to an intersection of the roads and an end point of the road. The link is a line segment connecting a node to another node and is data corresponding to the road. In this example, positions of the node and the link constituting the network data 213 are determined by three-dimensional data of latitude, longitude, and height.

A transmission/reception unit 201 conducts transmission/reception of data with the terminal 300 via the network NE2. In this example, transmission/reception of the map data and the command for displaying the three-dimensional map is mainly conducted. Moreover, the transmission/reception unit 201 also conducts communication with the data generating apparatus 100 via a network NE1. In this example, transaction of the generated map data is mainly conducted.

A database control unit 202 controls reading and writing of data with respect to the map database 210. A route search unit 203 makes a route search by using the network data 213 in the map database 210. For the route search, Dijkstra's algorithm or the like can be used. As described above, arrows indicating a route obtained by the route search and the like also fall under the two-dimensional objects.

In the data generating apparatus 100, illustrated functional blocks are configured. In this example, these functional blocks are configured by installing software which realizes the respective functions in a personal computer, but a part of or the whole of them may be configured by hardware.

A transmission/reception unit 105 sends/receives data to/from the server 200 via the network NE1. A command input unit 101 inputs an instruction of the operator via a keyboard or the like. In this example, the specification of regions where the map data should be generated, specification of the parallel projection parameters and the like are included. The parallel projection parameters refer to a projection angle and a projection azimuth when parallel projection is performed. The projection angle means a magnitude of inclination from the vertical direction in projection.

A 3D map database 104 is a database for storing the three-dimensional model used for generating the map data. For features such as roads and buildings, electronic data indicating the three-dimensional shapes is stored. Moreover, two-dimensional objects such as characters and symbols which should be displayed on the map are also stored.

A parallel projection unit 102 generates feature data by drawing, using parallel projection on the basis of the 3D map database 104. The drawn projection image is stored as parallel projection data 103 and stored in the feature data 211 of the map database 210 of the server 200 via the transmission/reception unit 105. A projection parameter modification unit 106 modifies the specified parallel projection parameters when parallel projection is performed and sets parallel projection parameters for the right eye/left eye. Though a modification method will be described later, the projection direction during parallel projection is made different between those for the right eye and those for the left eye. In this way, the image for the right eye and the image for the left eye for stereoscopic vision can be generated, respectively.

Figure 3A:
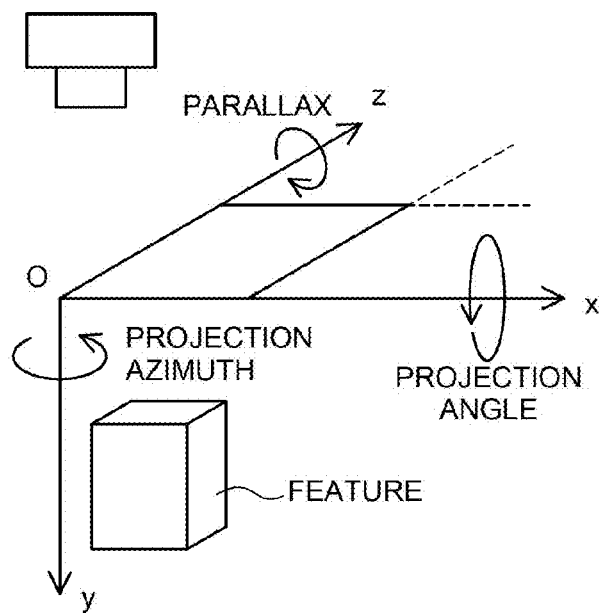
FIGS. 3A and 3B are explanatory diagrams illustrating a method of setting a parallel projection parameter.
Figure 3B:
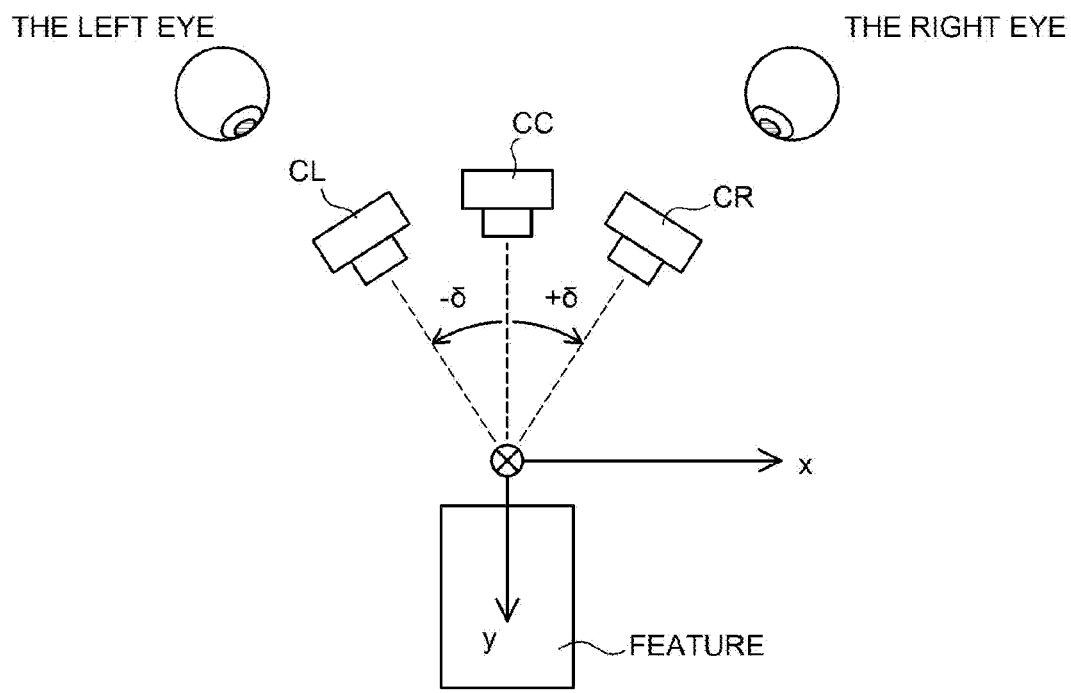

B. Setting of Parallel Projection Parameter:

FIGS. 3A and 3B are explanatory diagrams illustrating a setting method of a parallel projection parameter. The parallel projection parameters include the projection angle indicating inclination from the vertical direction and the projection azimuth.

First, as illustrated in FIG. 3A, three axes are defined. That is, the x-axis and the z-axis are defined on a horizontal plane, and the y-axis is defined in a vertical lower direction. The x-axis, y-axis, and z-axis are a right-handed coordinate system. As illustrated, a camera is placed vertically above a feature, and parallel projection is performed so that a two-dimensional map is drawn. The parallel projection referred to in this example is projection in a state inclined from this state.

In this case, if the camera is rotated around the x-axis, it is equal to parallel projection with diagonal inclination from the vertical direction, and the rotation around the x-axis indicates a projection angle. Moreover, if the camera is rotated around the y-axis, an azimuth of the parallel projection is changed in the horizontal direction, and the rotation around the y-axis indicates the projection azimuth. If the camera is rotated around the z-axis, parallax can be given as follows.

FIG. 3B illustrates a reason why parallax is generated. FIG. 3B is a state in which a feature is seen in the z-axis direction, that is, in a state in which the z-axis is perpendicular to the figure plane. The parallax is a difference in visual-line directions generated by a difference in positions of the right eye and the left eye when this feature is seen in the y-axis direction from vertically above. Therefore, by projecting at a camera position CR corresponding to a state seen from the right eye and a camera position CL corresponding to a state seen from the left eye to a reference camera position CC in the figure, images for the right eye/left eye given parallax can be generated. The parallax, that is, a rotation angle 6 around the z-axis can be set arbitrarily, but as an angle that can give parallax without sense of discomfort, approximately 20 degrees can be set, for example.

By performing parallel projection with consideration to the parallax illustrated in FIG. 3B in addition to the projection angle and the projection azimuth as described above, images for the right eye/left eye capable of stereoscopic vision can be generated even by the parallel projection.

C. Feature Data Generation Processing:

Subsequently, processing for generating feature data 211, that is, two-dimensional polygon data obtained by parallelly projecting the three-dimensional model of the feature for the right eye/left eye by changing the projection condition, respectively, will be described. This processing is processing executed mainly by the parallel projection unit 102 of the data generating apparatus 100 and processing executed by a CPU of the data generating apparatus 100 in terms of hardware.

Figure 4:
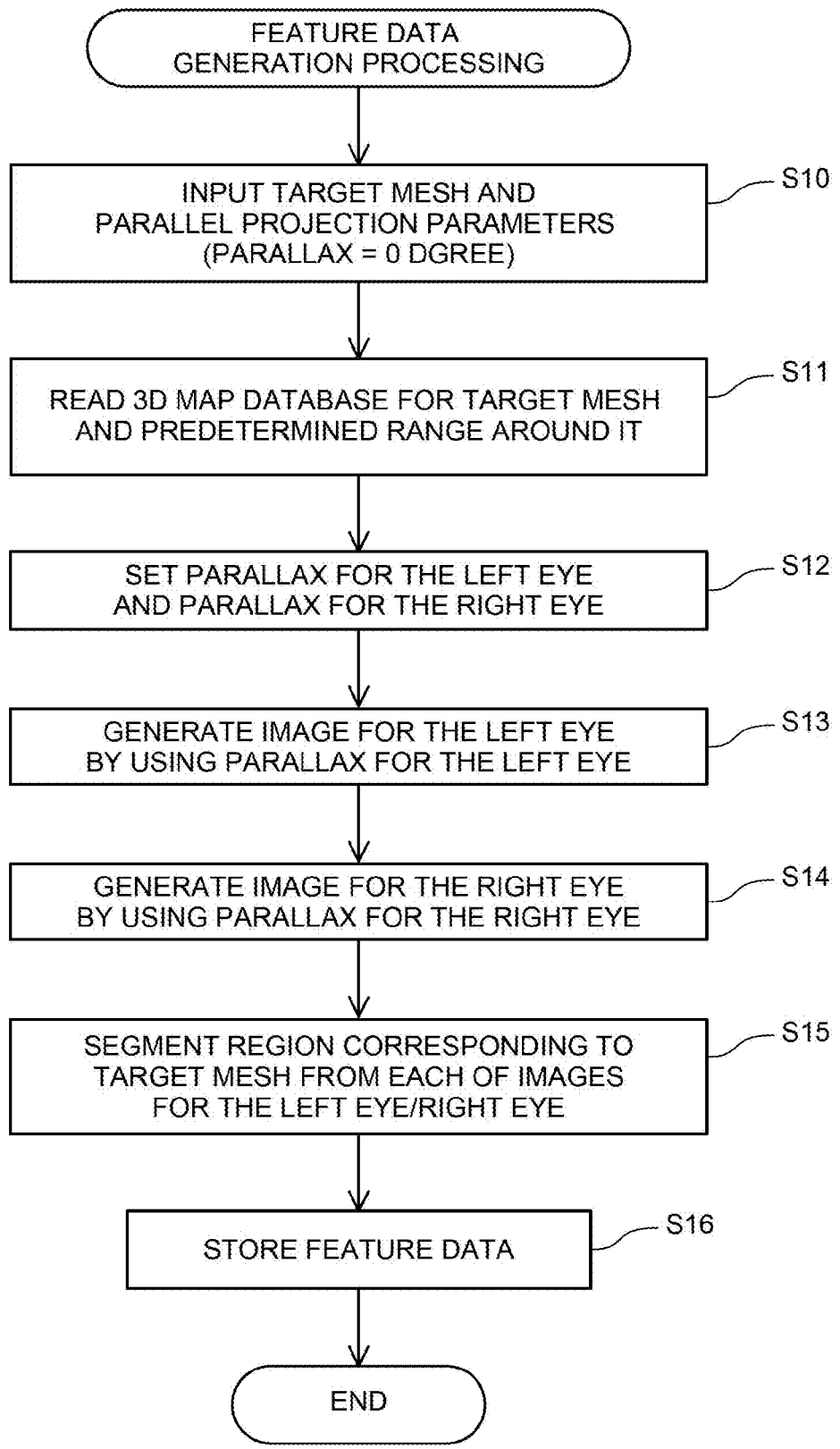
FIG. 4 is a flowchart of feature data generation processing.

FIG. 4 is a flowchart of feature data generation processing. When the processing is started, the CPU specifies a mesh to be processed and inputs the parallel projection parameters (Step S10). The mesh is a rectangular region having a predetermined size obtained by dividing the entire region to be a target of generation of map data. As a method of specifying a mesh, an index unique to the mesh, a coordinate of the mesh and the like can be used. A method in which the mesh containing a coordinate value of a point specified by the operator on the map is analyzed by the data generating apparatus 100, and this is set as a mesh to be processed may be used.

The parallel projection parameters are a projection azimuth and a projection angle. At this stage, parallax is assumed to be 0 degrees. The projection azimuth and projection angle may be specified by the operator each time the feature data is generated or default values may be used. The projection azimuth may be any one azimuth but in this example, parallel projection is performed for each of 8 azimuths obtained by shifting the azimuth by 45 degrees each so as to generate the feature data. By preparing the feature data in multiple azimuths as above, even if a blind spot such as behind a building is generated in any one of the projection azimuths, there is an advantage that display avoiding the blind spot can be realized by using the other projection azimuths.

Subsequently, the CPU reads the 3D map database for a target mesh and a mesh in a predetermined range around it (Step S11). The reason for reading also the mesh in the predetermined range around it is as follows.

In this example, the feature data is generated by parallelly projecting three-dimensional feature data included in the 3D map database from a diagonal direction inclined only by a predetermined projection angle with respect to the vertical direction. In the case of the parallel projection from the diagonal direction as above, a part of the feature present in the mesh around the mesh to be processed might be projected. On the contrary, if the parallel projection is performed by using the 3D map database only for the target mesh, it lacks a projection of the feature present in another mesh, and appropriate feature data cannot be obtained. In order to avoid this, in this example, the mesh around the target mesh is also read. The reading range can be arbitrarily set, but in this example, 3D map data belonging to meshes within 2 sections from the target mesh is read.

Subsequently, the CPU sets parallax for the left eye and parallax for the right eye (Step S12). As illustrated in FIG. 3B above, the direction of parallel projection determined by the projection azimuth and the projection angle is further rotated around the z-axis only by ±δ degrees. This processing corresponds to processing of the projection parameter modification unit 106.

The CPU generates the image for the left eye by performing parallel projection by using the parallax for the left eye set as above (Step S13) and generates the image for the right eye by performing parallel projection by using the parallax for the right eye (Step S14). The images generated, respectively, are two-dimensional image data expressing the feature three-dimensionally by parallel projection. The images for the left eye/right eye generated by parallel projection are called parallel projection data for the left eye/right eye in some cases.

The CPU segments a region corresponding to the target mesh from each of the images for the left eye/right eye obtained as above, respectively (Step S15), and stores it as the feature data made of the image data for the left eye and the image data for the right eye (Step S16). The image data is stored as two-dimensional polygon data but may also be stored as raster data. Moreover, in segmenting and storing of the image data for the left eye/right eye, each polygon may be provided with attributes such as a name, a position, a shape and the like.

By executing the above processing for all the projection azimuths and all the meshes, the data generating apparatus 100 can provide the feature data 211 of this example.

FIGS. 5A and 5B are explanatory diagrams illustrating an example of parallel projection data for the right eye/left eye. FIG. 5A illustrates parallel projection data for the right eye, and FIG. 5B illustrates parallel projection data for the left eye. In the respective images, the feature is displayed three-dimensionally by parallel projection. For example, when a region A1 and a region B1 as well as a region A2 and a region B2 are compared, respectively, a difference in parallax for the right eye/left eye can be recognized from how a side wall of a building is drawn or the like. By using the parallel projection data for the right eye/left eye prepared as above, a three-dimensional map can be viewed stereoscopically.

Figure 6:
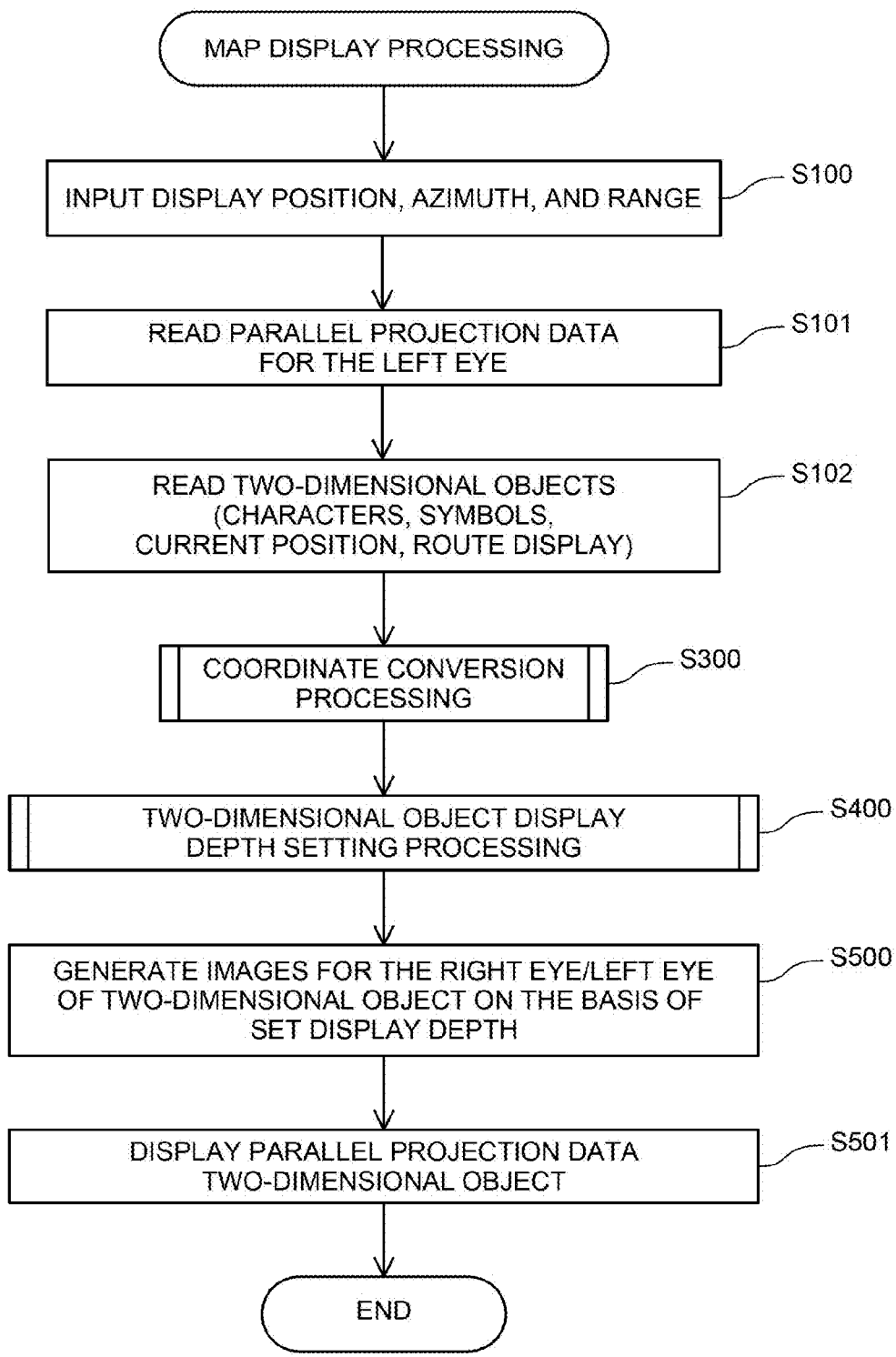
FIG. 6 is a flowchart of map display processing.

D. Map Display Processing:

FIG. 6 is a flowchart of map display processing. Here, an example of processing in which a map to be a background is displayed capable of stereoscopic vision in accordance with the spot and azimuth specified by the user, and a two-dimensional object such as a character and the like is displayed capable of stereoscopic vision in front of it is illustrated. This processing can be also used as route guidance display by being used together with the route search.

The map display processing is processing executed by the main control unit 304 and the display control unit 306 of the terminal 300 and is processing executed by the CPU of the terminal 300 in terms of hardware.

In this processing, first, the terminal 300 inputs a display position, an azimuth, and a range specified by the user (Step S100). The display position may use a current position obtained by GPS, for example. The terminal 300 reads parallel projection data for the left eye/right eye from the map information storage unit 305 in accordance with specification (Step S101). If data of a region not accumulated in the map information storage unit 305 is needed, the terminal 300 downloads the data from the server 200.

Subsequently, the terminal 300 similarly reads data of the two-dimensional objects (characters, symbols (including map symbols/traffic restriction signs), current position, route display and the like) from the map information storage unit 305 (Step S101). Regarding the two-dimensional objects, only those required may be read depending on the function of the map and the like.

Since a display position is specified in a three-dimensional space for the two-dimensional object, the terminal 300 applies coordinate conversion processing to the read two-dimensional object and acquires the display position on the display screen (Step S300). Here, a method of coordinate conversion will be described.

Figure 7:
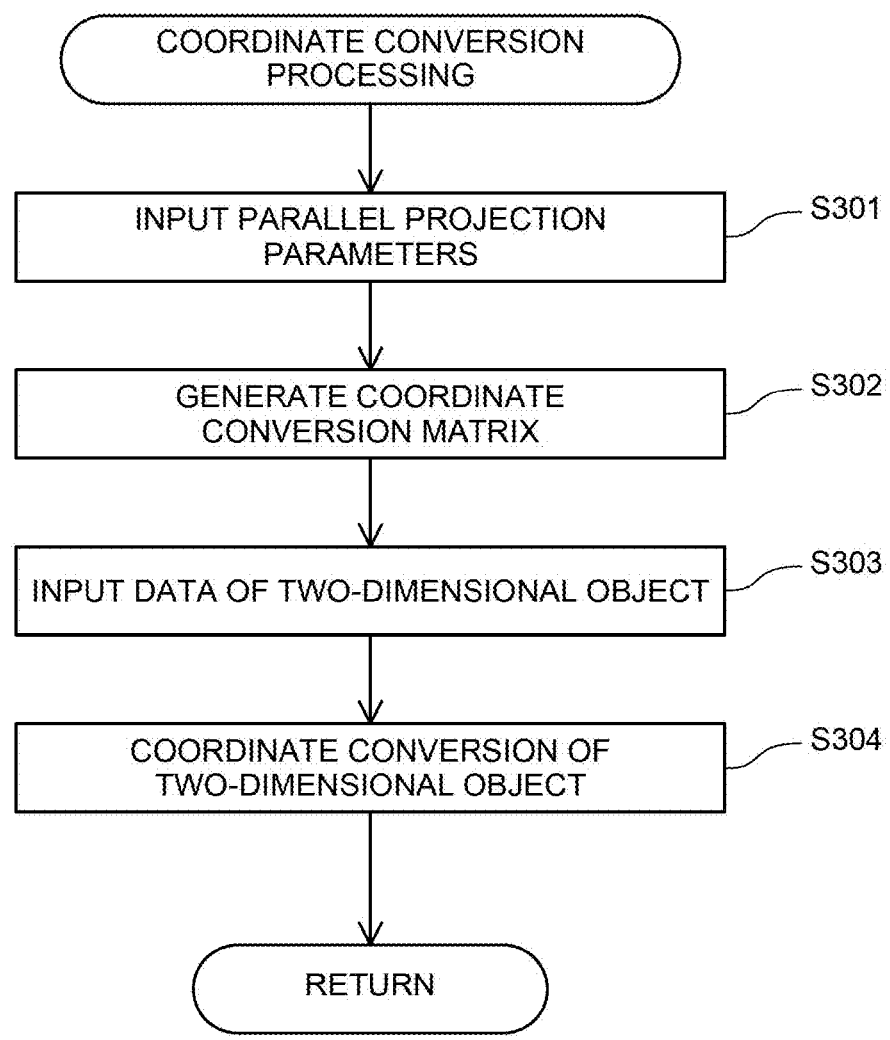
FIG. 7 is a flowchart of coordinate conversion processing.

FIG. 7 is a flowchart of the coordinate conversion processing. When the processing is started, the terminal 300 inputs the projection angle and projection azimuth as the parallel projection parameters and generates a coordinate conversion matrix (Steps S301 and 302). Here, since this is coordinate conversion for acquiring a display position to be a reference of the two-dimensional object (position corresponding to the center reference image in FIG. 1B), parallax is not used. The coordinate conversion matrix becomes a matrix obtained by rotating three-dimensional position information around the y-axis only by the projection azimuth (assumed to be $\beta$ degrees) and then, by rotating it around the x-axis only by the projection angle (assumed to be $\alpha$ degrees). The terminal 300 can acquire the position of the two-dimensional object on the display screen by inputting data of the two-dimensional object (Step S303) and by applying the coordinate conversion by the coordinate conversion matrix obtained by the above-described method (Step S304).

Returning to the map display processing in FIG. 6, subsequently, the terminal 300 execute two-dimensional object display depth setting processing (Step S400). This is processing for setting a display depth at which stereoscopic vision is performed for each of the two-dimensional objects. By means of this processing, stereoscopic vision in such an aspect in which character information is displayed on the front of other symbols and the like or if characters are overlapped, one of them is displayed in front of the other can be performed, for example.

Figure 8:
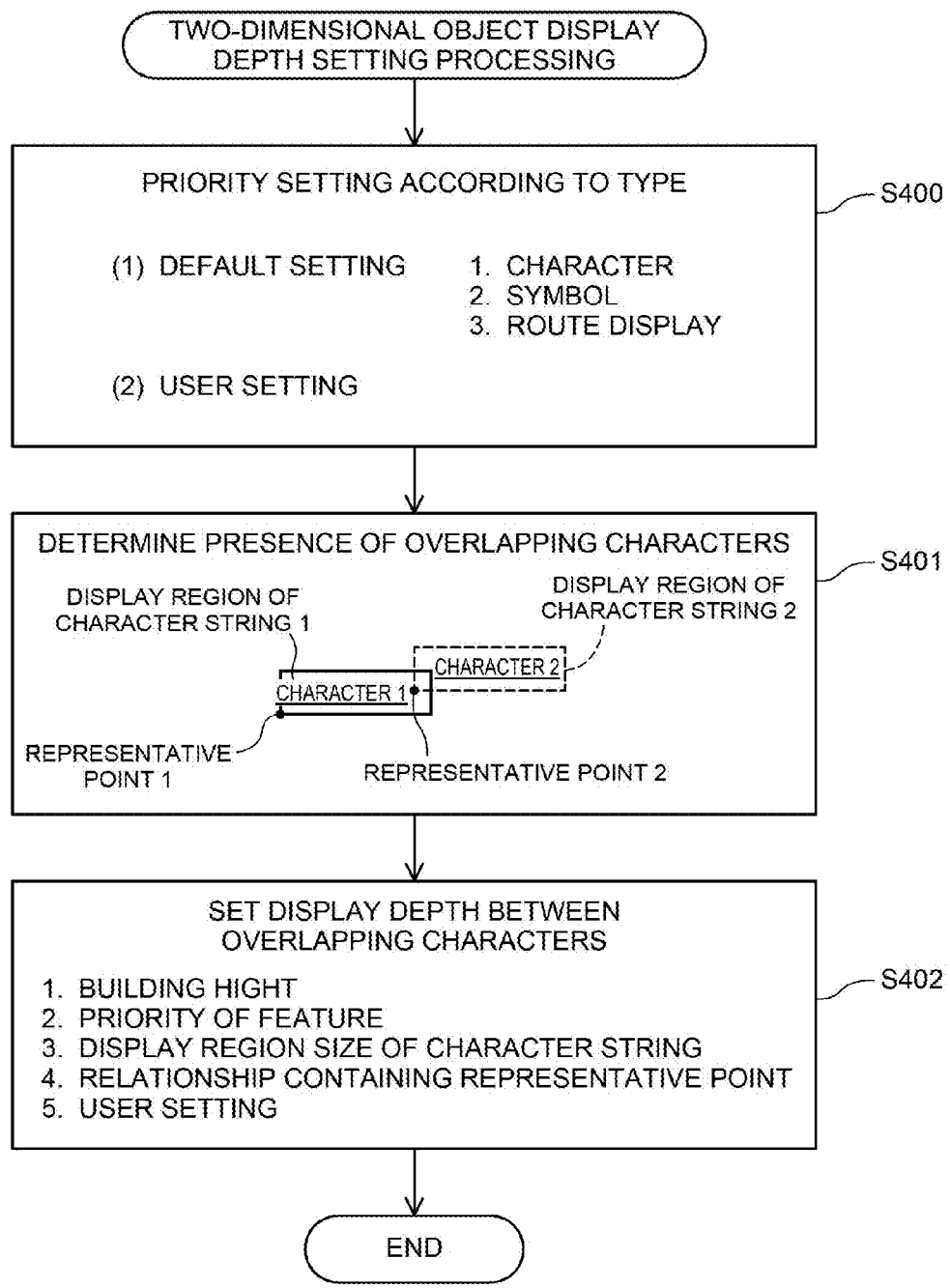
FIG. 8 is a flowchart of two-dimensional object display depth setting processing.

Here, contents of the display depth setting processing will be described by referring to FIG. 8. FIG. 8 is a flowchart of two-dimensional object display depth setting processing.

The terminal 300 first sets priority according to the type of the two-dimensional objects (Step S400). As illustrated in the figure, in this example, arbitrary setting by the user can be set in addition to default setting. In the default setting, the priority is set in the order of the character, symbol, and route display. This means that the characters are displayed on the foremost side and then, the symbols indicating the current position and traffic restriction, and the route display is displayed on the depth in this order. The priority in the default setting is not limited to the above, but arbitrary setting can be made.

Subsequently, the terminal 300 determines presence of overlapping characters (Step S401). A determination method is illustrated in the figure. Each character string has a representative point and a display region of a character, and a rectangular display region can be acquired as a range in which "character 1" and "character 2" are displayed, respectively, as illustrated in the figure on the basis of that. Presence of overlapping of characters is determined on the basis of a positional relationship between the display region of the character and the representative point. In the illustrated example, a representative point 2 of the character 2 belongs to a character string display region 1 of the character 1. On the other hand, a representative point 1 of the character 1 does not belong to a character string display region 2 of the character 2. Therefore, in such positional relationship, it can be determined that the character 2 is in a positional relationship to be hidden by the character 1. In the illustrated example, the representative point is set at lower left of the character string display region, but a position of the representative point can be set arbitrarily such as the position of the center of gravity of the character string display region.

The terminal 300 sets a display depth between the characters, if there are overlapping character strings (Step S402). The setting of the display depth can be made on the basis of various references shown below.

For example, as illustrated in the figure, if the character string falls under a name of a building, an attribute of the building associated with the character string is referred to, and a display depth of the character string may be set in accordance with the height. The character string of a higher building is set to be displayed on the front.

Moreover, setting may be made on the basis of priority of the feature. For example, the priority is set in accordance with the type of the feature such as landmark>general building>house>road so that the character string associated with a feature with higher priority is displayed on the front.

The setting may be made on the basis of a size of the display region size of the character string. Assuming that the character string with the larger display region size has higher importance, such character may be displayed on the front or to the contrary, assuming that the character string with the larger display region size can be recognized even if it is partially hidden, such character may be displayed on the depth.

Setting according to a relationship containing a representative point may be also made. A side on which the representative point belongs to another character string display region is determined to be a hidden side, and it is set to be displayed on the depth. If the respective representative points are mutually contained in the other character string display region, the display depth may be set on the basis of another reference.

The above-described methods automatically set the display depth, but besides them, the display depth may be specified individually by the user. In this way, it becomes possible to specify a hidden character on a map displayed once to come to the front and to have the map displayed again, for example. The display depth setting methods described here (Steps S400 to S402) may be used by selecting only one of them or by sequentially applying the plurality of setting methods with predetermined priority.

In the example in FIG. 8, the example in which the display depth is set for overlapping characters as a target is illustrated, but the similar method can be also applied to other two-dimensional objects. The display depth set by the processing illustrated in FIG. 8 may be configured capable of taking an arbitrary value or selecting any of values quantized in advance such as the display depths "deep", "medium", and "shallow".

Figure 1A:
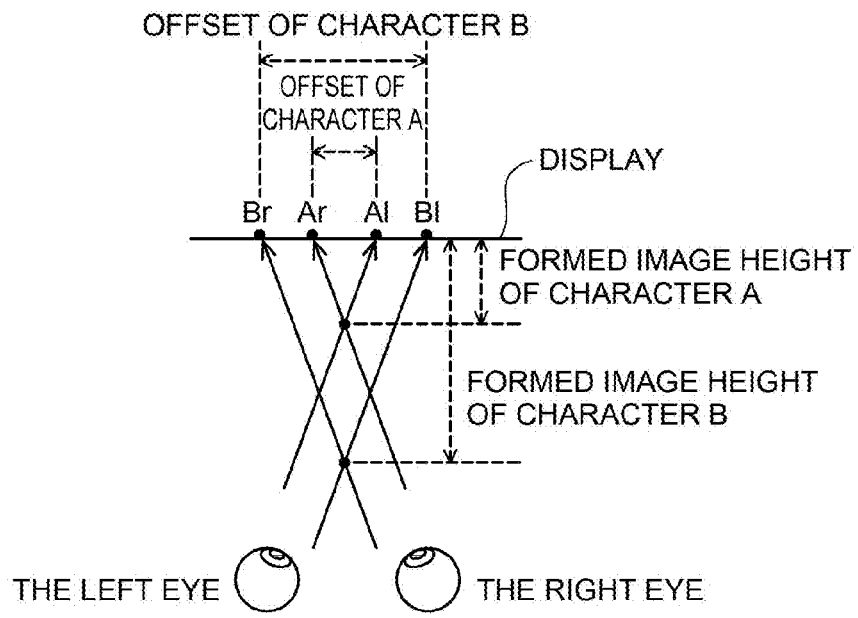
FIGS. 1A through 1C are explanatory diagrams illustrating a principle of stereoscopic vision of a display depth adjusted object.
Figure 1B:
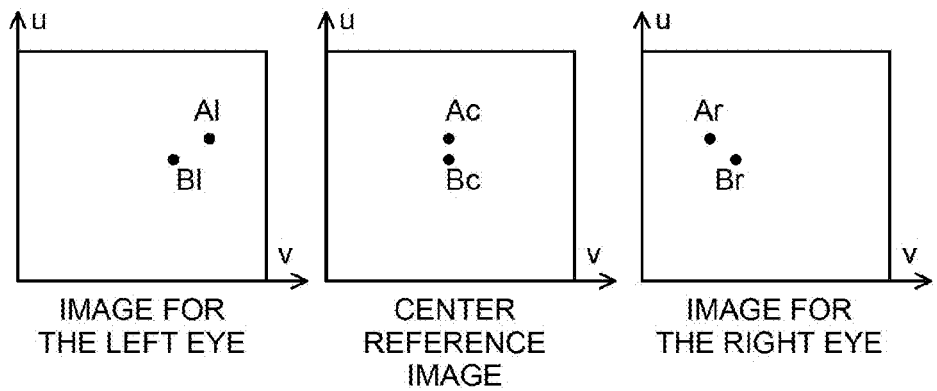
Figure 1C:
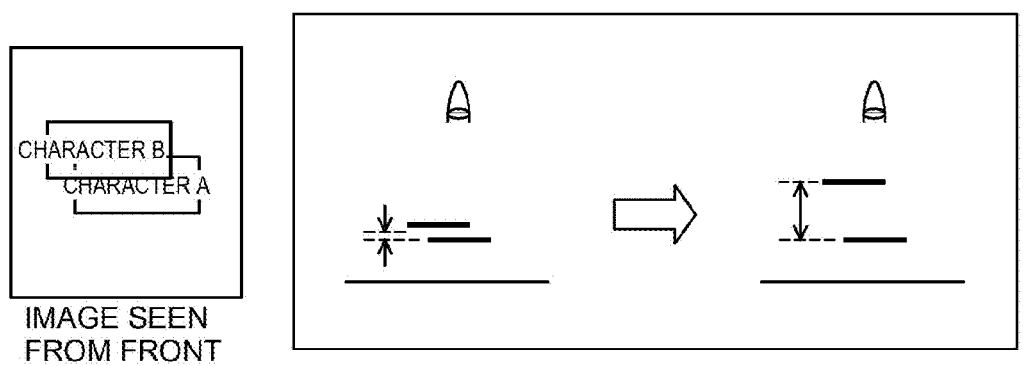

After setting the display depth as above, the terminal 300 generates images for the right eye/left eye of a two-dimensional object on the basis of the set display depth (Step S500). This can be obtained, as illustrated in FIG. 1A, by offsetting a display position of the two-dimensional object from a position obtained by the coordinate conversion (Step S300) to left or right (x direction). The offset amount can be acquired by the following idea.

That is, displacement of the x-coordinate obtained by setting a two-dimensional object at a three-dimensional position according to a set display depth h and having a rotation matrix by parallax δ act becomes an offset amount of the two-dimensional object for the right eye/left eye. Since the specified value (20 degrees in this example) is used as parallax δ and it is not a variable value, the offset amount of the coordinate when this rotation matrix is made to act as a function of the display depth h and is given by "offset amount=h·tan δ". Therefore, by storing this function in advance, an offset amount according to the display depth can be easily obtained.

Lastly, the terminal 300 displays the parallel projection data for the left eye/right eye and the two-dimensional object in a superposed manner (Step S501) and finishes the map display processing. By recognizing the image for the right eye displayed as above by the right eye and the image for the left eye by the left eye, the user can stereoscopically view the map of the background and the two-dimensional object. The parallel projection data for the left eye/right eye is only two-dimensional polygon data after parallel projection has been performed, and thus, stereoscopic vision can be realized with a light load only by drawing a polygon in accordance with the obtained data without performing projection processing in the processing at Step S501.

According to the stereoscopic map display system of this example described above, since the two-dimensional object can be displayed stereoscopically with changed display depth, even if the two-dimensional objects are overlapped with each other, they can be discriminated, which is an advantage.

Moreover, when such stereoscopic vision is to be realized, apart from an image for stereoscopic vision of a map to become a background, a stereoscopic image of the two-dimensional object can be generated by an offset, and thus, stereoscopic vision of the two-dimensional object can be realized with relatively light load and flexibility.

Furthermore, in this example, stereoscopic vision is realized in a map by using parallel projection data. Since the parallel projection data can be used in common for all the regions regardless of a viewpoint position, image data for stereoscopic vision can be also generated in advance for all the regions, which leads to an advantage that stereoscopic vision can be realized with an extremely light load.

The example of the present invention has been described. The stereoscopic map display system does not necessarily have to be provided with all the functions in the above-described example, but only a part of them may be realized. Moreover, an additional function may be provided in the above-described contents.

In the example, parallax is given to the two-dimensional object at display, but as a variation, a two-dimensional object may be configured capable of stereoscopic vision with parallax determined in advance. In such a case, data of the two-dimensional object 212 may be stored in a format of an image for the right eye and an image for the left eye capable of stereoscopic vision by giving an offset to the two-dimensional object (Step S500 in FIG. 8). Moreover, image data in a state in which the feature data 211 and the two-dimensional object 212 are superposed can be also stored as the feature data 211.

Moreover, a default offset amount or a display depth may be associated in advance with each of the two-dimensional objects and stored. In this way, the display depth setting processing (FIG. 8) can be omitted, and stereoscopic vision of the two-dimensional object can be realized.

The display depth or offset amount of the two-dimensional object does not necessarily have to be stored in association with the two-dimensional object but may be stored in the feature data, for example. In this aspect, after the display position of the two-dimensional object is obtained by coordinate conversion (Step S300 in FIG. 6), by referring to the feature data corresponding to the coordinate value, the display depth or offset amount can be obtained.

As described above, as a method of associating the display depth or offset amount with the two-dimensional object, various other methods can be employed.

The present invention is not limited to the above-described example but it is needless to say that various configurations can be employed within a range not departing from its gist. For example, a portion configured by hardware in the example may be configured by software and vice versa.

The present invention can be used to provide a various types of information displayed on a map other than features in an easily recognizable aspect.

What is claimed is:
1. A stereoscopic map display system for providing a stereoscopic vision of a map, the system comprising:

a stereoscopic vision display unit for realizing the stereoscopic vision of the map by displaying a first image for a right eye and a second image for a left right eye with a parallax so as to be visually recognized by the right eye and the left eye, respectively;

a map database storage unit for storing map data, the map data including:

feature data indicating respective shapes of features on the map; and two-dimensional object data indicating objects other than the features, each object being displayed with an adjusted display depth which is adjusted under a predetermined rule; and a display control unit for controlling the stereoscopic vision display unit by providing thereto the first image for the right eye and the second image for the left eye based on the map data, at least a part of the first and second images having the parallax given thereto, wherein the display control unit generates the first and second images for the objects separately from generating the first and second images for the feature data, such that each of the objects is displayed as a display depth adjusted object with the adjusted display depth individually set by the predetermined rule based on an attribute or a display position of the object.

2. The stereoscopic map display system according to claim 1, wherein the display control unit provides the first image for the right eye and the second image for the left eye expressing the feature data three-dimensionally with the given parallax.

3. The stereoscopic map display system according to claim 2, wherein the map data includes, as the feature data, parallel projection data for the right eye and parallel projection data for the left eye as two-dimensional images obtained by parallelly projecting data expressing a three-dimensional shape of a feature from a diagonal direction inclined with respect to a vertical direction by a predetermined projection angle by changing a projection condition so as to provide the parallax, and wherein the display control unit provides the stereoscopic vision display unit with a range of the parallel projection data for the right eye and the parallel projection data for the left eye corresponding to a range of the map to be displayed.

4. The stereoscopic map display system according to claim 2, wherein the display control unit provides a first parallax to the first and second images for the feature data by making a projection condition for three-dimensionally expressing the feature data for the right eye and that for the left eye different from each other; and wherein the control unit provides a second parallax to the first and second images for the object by laterally shifting a display position thereof in accordance with the adjusted display depth of the object.

5. The stereoscopic map display system according to claim 2, further comprising:

a display depth setting unit for setting the display depth for the object based on an instruction given by a user, wherein the display control unit generates the parallax for displaying the object in accordance with the display depth set by the display depth setting unit.

6. The stereoscopic map display system according to claim 3, wherein the display control unit provides a first parallax to the first and second images for the feature data by making a projection condition for three-dimensionally expressing the feature data for the right eye and that for the left eye different from each other; and wherein the control unit provides a second parallax to the first and second images for the object by laterally shifting a display position thereof in accordance with the adjusted display depth of the object.

7. The stereoscopic map display system according to claim 3, further comprising:

a display depth setting unit for setting the display depth for the object based on an instruction given by a user, wherein the display control unit generates the parallax for displaying the object in accordance with the display depth set by the display depth setting unit.

8. The stereoscopic map display system according to claim 1, further comprising:

a display depth setting unit for setting the display depth for the object based on an instruction given by a user, wherein the display control unit generates the parallax for displaying the object in accordance with the display depth set by the display depth setting unit.

9. The stereoscopic map display system according to claim 1, wherein each of the objects does not have a three-dimensional shape and is a two-dimensional object representing information expressed on the map.

10. The stereoscopic map display system according to claim 9, wherein the information represented by the objects includes at least one of:

one or more characters indicating a name of a feature;
one or more characters indicating a name of a place;
one or more characters indicating guidance information;
a map symbol;
a traffic restriction sign;
a current position in a route guidance; or
a route in the route guidance.

11. A method of displaying a map executed by a computer using to a stereoscopic vision display unit for realizing a stereoscopic vision of the map by displaying a first an image for a the right eye and a second an image for a the left right eye with a parallax so as to be visually recognized by the right eye and the left eye, respectively, the method comprising the steps of:

reading map data from a man database storage unit, the map data including:

feature data indicating respective shapes of features on the map; and two-dimensional object data indicating objects other than the features, each object being displayed with an adjusted display depth which is adjusted under a predetermined rule; and controlling the stereoscopic vision display unit by providing thereto the first image for the right eye and the second image for the left eye based on the map data, at least a part of the first and second images having the parallax given thereto, wherein the controlling step generates the first and second images for the objects separately from generating the first and second images for the feature data, such that each of the objects is displayed as a display depth adjusted object with the adjusted display depth individually set by the predetermined rule based on an attribute or a display position of the object.

12. The method of displaying a map according to claim 11, wherein each of the objects does not have a three-dimensional shape and is a two-dimensional object representing information expressed on the map.

13. The method of displaying a map according to claim 12, wherein the information represented by the objects includes at least one of:
one or more characters indicating a name of a feature;
one or more characters indicating a name of a place;
one or more characters indicating guidance information;
a map symbol;
a traffic restriction sign;
a current position in a route guidance; or
a route in the route guidance.

14. A non-transitory computer-readable recording medium storing a computer program for displaying a map using a stereoscopic vision display unit for realizing a stereoscopic vision by displaying a first an image for the right eye and a second an image for the left right eye with a parallax so as to be visually recognized by the right eye and the left eye, respectively, the computer program for allowing a computer to execute functions of:
reading map data from a map database storage unit, the map date including:
feature data indicating respective shapes of features on the map; and
two-dimensional object data indicating objects other than the features,
each object being displayed with an adjusted display depth which
is adjusted under a predetermined rule; and
controlling the stereoscopic vision display unit by providing thereto the first image for the right eye and the second image for the left eye based on the map data, to at least a part of the first and second images having the parallax is given thereto,
wherein the controlling function generates the first and second images for the objects separately from generating the first and second images for the feature data, such that each of the objects is displayed as a display depth adjusted object with the adjusted display depth individually set by the predetermined rule based on an attribute or a display position of the object.

15. The non-transitory computer-readable recording medium according to claim 14, wherein each of the objects does not have a three-dimensional shape and is a two-dimensional object representing information expressed on the map.

16. The non-transitory computer-readable recording medium according to claim 15, wherein the information represented by the objects includes at least one of:
one or more characters indicating a name of a feature;
one or more characters indicating a name of a place;
one or more characters indicating guidance information;
a map symbol;
a traffic restriction sign;
a current position in a route guidance; or
a route in the route guidance.

* * * * *